United States Patent [19]
Arendt et al.

[11] 3,897,355

[45] July 29, 1975

[54] METHOD OF MAKING PERMANENT FERRITE MAGNETS

[75] Inventors: Ronald H. Arendt; William J. Dondalski, both of Schenectady, N.Y.

[73] Assignee: General Electric Company, Schenectady, N.Y.

[22] Filed: Apr. 26, 1973

[21] Appl. No.: 354,878

[52] U.S. Cl. ....... 252/62.58; 252/62.59; 252/62.63; 264/63
[51] Int. Cl.² C04B 33/32; C04B 35/26; H01F 1/11
[58] Field of Search.......... 252/62.58, 62.63, 62.59; 264/24, 62, 63, 65

[56] References Cited
UNITED STATES PATENTS 3,246,060   4/1966   Blume.................................. 264/62
3,337,461   8/1967   Cochardt.......................... 252/62.63
3,764,539  10/1973   Cochardt et al................. 252/62.63

*Primary Examiner*—Donald J. Arnold
*Attorney, Agent, or Firm*—Charles T. Watts; Joseph T. Cohen; Jerome C. Squillaro

[57] ABSTRACT

A method of making sintered magnetoplumbite ferrite compositions having the formula $MFe_{12}O_{19}$ wherein M is selected from the group consisting of strontium and barium is provided. The steps comprise forming an aqueous slurry of the ferrite and a liquid phase sintering additive, orienting the ferrite to align the crystals and wet pressing the mixture to form a green compact, sintering the green compact at a temperature of about 1,100°–1,300° C. for a sufficient amount of time and magnetizing the sintered ferrite compositions.

3 Claims, No Drawings

METHOD OF MAKING PERMANENT FERRITE MAGNETS

This invention relates to a method of making permanent ferrite magnets and in particular to materials which have a hexagonal lattice structure and are known as magnetoplumbite ferrites. The properties of these materials, their crystal structure and the method of preparation have been disclosed in the prior art.

The commercial preparation of magnetoplumbite ferrites involves the solid state reaction of an iron oxide with a divalent metal oxide yielding compound such as the carbonate, hydroxide, or nitrate of lead, strontium or barium at a temperature of 1,000°–1,300° C. in an air atmosphere. A reactant stoichiometry of $MO:Fe_2O_3$ (wherein M is Pb, Sr or Ba) in the range of 1:4 to 1:5.5 is commonly used in distinction to the crystallographic stoichiometry of 1:6. This is done to compensate for iron contamination during subsequent processing as well as possible volatization of the divalent metal oxide during the reaction. The product is in the form of crystallites or aggregates of crystallites ranging in size from tens of microns to millimeters. Since the single magnetic domain crystallite size is about one micron, this material is milled to reduce the aggregate and crystal size to this value. As a result of milling, the powder undergoes a net enhancement of its intrinsic coercive field as well as having introduced numerous crystallographic imperfections into the structure. The removal of these imperfections is required to achieve the desired high magnetic quality in the sintered magnet.

Heretofore it was common practice to add a few weight percent of an impurity such as silica, alumina, strontium sulfate, bismuth oxide and lead oxide to the unreacted mixture or to the $MFe_{12}O_{19}$ prior to milling to improve the magnetic and ceramic quality of the resultant sintered material. Further, it has been disclosed by Ireland, U.S. Pat. No. 2,980,617 that the maximum energy product of the ferrite is increased by adding, prior to compacting, various refractory oxides such as silica, alumina, titania, boric oxide and mixtures such as alumina-silica, calcium oxide-silica, calcium oxide-titania, alumina-titania, chromic oxide-silica, and chromic oxide-titania. In the case of the physical mixtures, the compounds are preferably combined in equal parts by weight. The preferred materials disclosed in the alumina-silica combination are represented by an aluminum silicate such as a silica-alumina porcelain, kaolin, and mullite or other clays or minerals consisting essentially of aluminum silicates. Unfortunately, in the method heretofore proposed, some of the MO from the ferrite mixture is leached out into the liquid phase increasing the ferric oxide content resulting in a dilution of the magnetic properties, i.e. the residual induction.

In accordance with the present invention, we have discovered a method of making a magnetoplumbite ferrite having the formula $MFe_{12}O_{19}$, wherein M is selected from the group consisting of strontium and barium, comprising the steps of forming an aqueous slurry of the magnetoplumbite ferrite and a liquid phase sintering additive, orienting the ferrite to align the crystals, wet pressing the mixture to form a green compact, sintering the green compact at a temperature of about 1,100°–1,300° C. for a time of about 5 minutes to 8 hours and then magnetizing the sintered ferrite.

The magnetoplumbite ferrites, i.e., $BaFe_{12}O_{19}$ and $SrFe_{12}O_{19}$ may be prepared by the reaction of ferric oxide and the corresponding alkaline earth metal carbonate in a molten salt solvent. The molten salt solvent is then leached from the product to give a monodispersed powder with maximum crystallite dimensions of about one micron. Another procedure for preparing the magnetoplumbite ferrites in the form of micron and submicron size particles involves reacting the cation oxides of the ferrites in a solvent of sodium chloride and potassium chloride in the presence of a source of water and is disclosed in U.S. Pat. application No. 310,354 filed on Nov. 29, 1972 now U.S. Pat. No. 3,793,443 and assigned to the assignee of the present invention. A further method of making the magnetoplumbite ferrites is disclosed in U.S. Pat. application No. 323,084, filed on Jan. 12, 1973 now U.S. Pat. NO. 3,810,973 and assigned to the assignee of the present invention wherein an aqueous solution of ferric chloride is reacted with an alkaline metal hydroxide to form ferric oxide hydrate in a salt solution and then an alkaline earth carbonate is added to the mixture. After drying, the ferric oxide in the alkaline earth metal carbonate are reacted in a molten salt solvent and the particulate ferrite is recovered.

The liquid phase additives useful in our invention must all contain a divalent metal oxide selected from the group consisting of lead oxide, barium oxide and strontium oxide. The presence of the divalent metal oxides is necessary to avoid the leaching of these oxides from the magnetoplumbite ferrite. The liquid phase sintering additives useful in our invention are represented by the following systems:

1. $PbO-Al_2O_3-SiO_2$

The composition $PbO:SiO_2$ varies from 1:4 to 4:1. The $Al_2O_3$ may be added as $PbAl_2O_4$ and constitutes 0.0 to 50.0 weight percent of the total additive composition.

2. $PbO-Al_2O_3-B_2O_3$

The composition $PbO \cdot B_2O_3$ varies from 1:4 to 4:1. The $Al_2O_3$ may be added as $PbAl_2O_4$ and constitutes 0.0 to 50.0 weight percent of the total additive composition.

3. $BaO-Al_2O_3-B_2O_3$

The additive composition varies from $BaSiO_3$ to $BaO \cdot 6SiO_2$. The $Al_2O_3$ may be added as $BaAl_2O_4$ and constitutes 0.0 to 50.0 weight percent of the total additive.

4. $BaO-Al_2O_3-B_2O_3-SiO_2$

The additives in this system have the composition $xBaB_2O_4 \cdot (1-x)BaSiO_3$, wherein $x$ is equal to 0.0 to 1.0; with $Al_2O_3$ being added as $BaAl_2O_4$ in an amount up to 50 weight percent of the total additive composition.

5. $SrO-Al_2O_3-SiO_3$

The additive compositions varies from $SrSiO_2$ to $SrO \cdot 6SiO_2$. The $Al_2O_3$ may be added as $SrAl_2O_4$ and constitutes 0.0 to 50.0 weight percent of the total additive.

6. $SrO \cdot Al_2O_3-B_2O_3-SiO_2$

The additives in this system have the composition $ySrB_2O_4 \cdot (1-y)SrSiO_3$, wherein $y$ is equal to 0.0 to 1.0; with $Al_2O_3$ being added as $SrAl_2O_4$ in an amount up to 50 weight percent of the total additive.

The amount of the additives required to give the beneficial effect during liquid phase sintering is generally in the range of about 0.5–6.0 percent by weight.

The liquid phase additives may be prepared by dry mixing the components and heating them in covered platinum crucibles to their melting points. The products are then ground to −325 mesh and remelted to form a homogeneous composition. The vitreous material obtained is then reground to −325 mesh and combined with the magnetoplumbite ferrite. In the preferred method of making the sintered products by our invention, the magnetoplumbite ferrites are milled with the liquid phase additive in a steel ball mill. A milling fluid, such as methanol, is used which may be subsequently removed by volatization. The milling step reduces the particle size of the additive and in addition homogenizes the magnetoplumbite ferrite and the additive mixture to a higher degree than obtained by simple dry mixing. The composition is then wet pressed and oriented to align the crystals and to form a green compact. Typically, pressing is performed at a pressure of about 2000–20,000 psi using a steel die. The samples are thereafter placed in a furnace and fired at a temperature of about 1,100°–1,300° C. in an air or pure oxygen atmosphere for a time of about 5 minutes to 8 hours.

The products obtained by the process of the present invention should have a density of 90 percent of theoretical or greater and should have properties which are equivalent or superior to the industry standards for $BaFe_{12}O_{19}$ sintered magnets (Ceramic 5) and $SrFe_{12}O_{19}$ sintered magnets (Ceramic 7) as shown in the following table:

TABLE I

|  | Ceramic 5 | Ceramic 7 |
|---|---|---|
| $B_r$(G.) | 3950 | 3400 |
| $H_c$ (Oe.) | 2300 | 3250 |
| $H_{ci}$ Oe. | 2350 | >4200 |
| $(BH)_{max}$ ($\times 10^6$ G.Oe.) | 3.5 | 2.7 |

Our invention is further illustrated by the following examples:

EXAMPLE I

Using a steel ball mill, 30 g. of (molten salt synthesized) $BaFe_{12}O_{19}$ and 1.2 g. of $BaB_2O_4 \cdot BaSiO_3$ were milled in the presence of methanol as a milling fluid for 24 hours. The homogeneous mixture was then removed from the mill and the methanol evaporated off. The resultant powder having a particle size of ≤ 1.0μ was then slurried in water, and wet pressed in conventional equipment at pressures of 2000–20,000 psi to form green samples.

The samples were thereafter fired in an oxygen containing atmosphere at a temperature of 1,100°–1,300° C. for 5 minutes to 8 hours.

The magnetic properties of the magnets obtained after sintering were typically as follows:

| | |
|---|---|
| $B_r$ | = 3950 Gauss |
| $H_c$ | = 2450 Oersteds |
| $H_{ci}$ | = 2500 Oersteds |
| $(BH)_{max}$ | = $3.7 \times 10^6$ Gauss-Oersted |

A control experiment was performed by preparing several samples of pure $BaFe_{12}O_{19}$, free of any additives, using several different pressing pressures and sintering temperatures. There was no densification at temperatures ≤ 1300° C. The samples were chalky and could be crushed easily into a coarse powder. Chemically pure, 1.0μ $BaFe_{12}O_{19}$, therefore, will not densify below 1300° C. without sintering agents.

EXAMPLE II

Following the procedure of Example I, 30.0 g. of $BaFe_{12}O_{19}$ were milled with 0.6 g. $BaSiO_3$. The homogeneous mixture was pressed and then sintered at 1,210° C. for 2 hours in an air atmosphere. The magnetic properties of the product were as follows:

| | |
|---|---|
| $B_r$ | = 4000 Gauss |
| $H_c$ | = 2350 Oersted |
| $H_{ci}$ | = 2400 Oersted |
| $(BH)_{max}$ | = $2.8 \times 10^6$ Gauss Oersted |

EXAMPLE III

Following the procedure of Example I, 30.0 g. of $BaFe_{12}O_{19}$ were milled with 1.2 g. of an additive consisting in weight percent of 90% $BaB_2O_4 \cdot BaSiO_2$ and 10% $BaAl_2O_4$ in methanol. The methanol was dried off and the sample was slurred in water, oriented and wet pressed. The sample was sintered at 1,115° C. for 2 hours. The magnetic properties were as follows:

| | |
|---|---|
| $B_r$ | = 3650 G. |
| $H_c$ | = 2875 Oe. |
| $H_{ci}$ | = 2975 Oe. |
| $(BH)_{max}$ | = $3.2 \times 10^6$ G. Oe. |

EXAMPLE IV

Following the procedure of Example I, the additive compositions, $PbO:SiO_2$ or $PbO:B_2O_3$, were varied from 1:4 to 4:1. The $Al_2O_3$ was added as $PbAl_2O_4$ and constituted 0.0 to 50.0 w/o of the total additive composition. Two and 4 w/o of the additive in $BaFe_{12}O_{19}$ samples were prepared, and air fired for 2 hours at sintering temperature of 1,100°, 1,150°, 1,200°, 1,250° and 1,300° C.

The microstructures varied from small, ~1.0μ grains in the 1,100° C., relatively low-density samples to large, multidomain crystallites in the 1,300° C., relatively high-density samples. Assuming a limitation to single domain size of ≤ 1.0μ, a density greater than 88% could not be attained without simultaneous grain growth to multidomain size. In addition, variations of the $PbO:SiO_2$ or $PbO:B_2O_3$ ratio resulted in only minor variation in both density and microstructure. The $PbAl_2O_4$ containing additives better maintained the ≤ 1.0μ grain size with only a small decrease in density when compared to an $Al_2O_3$-free sample prepared under the same sintering schedule. Hence, $Al_2O_3$ is an important factor in microstructure control in these PbO-based liquid-phase sintering additive systems.

Anisotropic magnets were prepared from powder samples which gave the best isotropic magnet densities and microstructures. Table II gives the magnetic properties for those samples prepared with high $PbAl_2O_4$ content additives.

TABLE II

MAGNET PROPERTIES OBTAINED USING ADDITIVES IN THE SYSTEMS PbO—Al$_2$O$_3$—SiO$_2$

|  | A | B |
|---|---|---|
| Br (G.) | 3900 | 3850 |
| H$_c$ (Oe.) | 2450 | 2525 |
| H$_{ci}$ (Oe.) | 2500 | 2575 |
| (BH)$_{max}$ (×10$^6$ G. Oe.) | 3.6 | 3.5 |

A 62.5 w/o PbSiO$_3$ + 37.5 w/o PbAl$_2$O$_4$, 4 w/o additive, fired at 1185° C. for 2 hours in air.
B 50 w/o PbSiO$_3$ + 50 w/o PbAl$_2$O$_4$, 4 w/o additive, fired at 1185° C. for 2 hours in air.

EXAMPLE V

Following the procedure of Example I, the additive compositions were varied from BaSiO$_3$ to BaO·6SiO$_2$. The Al$_2$O$_3$ was added as BaAl$_2$O$_4$ and constituted 0.0 to 50.0 w/o of the total additive composition. The quantity of additive in the ferrite was varied from 1.0 to 6.0 w/o. Representative data are given in Table III to show the effects of variations in the BaO:SiO$_2$ ratio as well as additions of BaAl$_2$O$_4$. All samples were sintered for 2 hours in an air atmosphere at the indicated temperature. These data show that the degree of densification increases rapidly with temperature. There is some difference in density as a function of the BaO:SiO$_2$ ratio, but primarily at lower sintering temperatures. The addition of BaAl$_2$O$_4$ reduces the degree of densification at lower temperatures, but the effect nearly disappears at the higher temperatures. The present system results in slightly lower density values than did the PbO-based additives.

TABLE III

SINTERED DENSITIES (%) OF ISOTROPIC BaFe$_{12}$O$_{19}$ MAGNETS USING ADDITIVES IN THE SYSTEM BaO—Al$_2$O$_3$—SiO$_2$

|  | BaSiO$_3$ | 50 w/o BaSiO$_3$—50 w/o BaAl$_2$O$_4$ | BaO·3SiO$_2$ | 50 w/o BaO·3SiO$_2$—50 w/o BaAl$_2$O$_4$ |
|---|---|---|---|---|
| 2.0 w/o |  |  |  |  |
| 1100°C. | 69.1 | — | 79.9 | — |
| 1200°C. | 86.7 | — | 92.6 | — |
| 1300°C. | 95.4 | — | 95.0 | — |
| 4.0 w/o |  |  |  |  |
| 1100°C. | 80.3 | 67.4 | 86.9 | 68.3 |
| 1200°C. | 92.3 | 82.3 | 92.8 | 85.0 |
| 1300°C. | 94.3 | 92.4 | 93.0 | 93.2 |

Examination of the sample microstructures showed excellent control of grain size in the temperature range 1,100° to 1,250° C., and only at 1,300° C. was there evidence of large, multidomain crystallite formation. There is little difference in the microstructure attained by varying the BaO:SiO$_2$ ratio, but the addition of BaAl$_2$O$_4$ aids greatly in the preservation of a small crystallite size.

Anisotropic sintered magnets were prepared from selected powder samples. Table IV gives the data for those samples. The addition of BaAl$_2$O$_4$ results in a lower density; hence lower Br and (BH)$_{max}$, but yields a marked increase in H$_c$ and H$_{ci}$. These results indicate that BaAl$_2$O$_4$ controls the microstructure and/or crystallite morphology better than the Al$_2$O$_3$-free additives and therefore results in fewer defects that give rise to low values for H$_c$ and H$_{ci}$.

TABLE IV

MAGNETIC DATA FOR ANISOTROPIC BaFe$_{12}$O$_{19}$ MAGNETS PREPARED WITH ADDITIVES IN THE SYSTEM BaO—Al$_2$O$_3$—SiO$_2$

|  | C | D | E |
|---|---|---|---|
| Br (G.) | 3950 | 3900 | 3650 |
| H$_c$ (Oe.) | 2425 | 2425 | 3200 |
| H$_{ci}$ (Oe.) | 2450 | 2475 | 3275 |
| (BH)$_{max}$ (×10$^6$ G. Oe.) | 3.6 | 3.6 | 3.2 |

C 4.0 w/o BaSiO$_3$; sintered at 1240° C., 2 hours, in air.
D 2.0 w/o BaO·3SiO$_2$; sintered at 1140° C., 2 hours, in air.
E 4 w/o (62 w/o BaSiO$_3$ + 37.5 w/o BaAl$_2$O$_4$); sintered at 1185° C., 2 hours, in air.

EXAMPLE VI.

Following the procedure of Example I, the BaFe$_{12}$O$_{19}$ was milled with 4 w/o of an additive consisting of 75 w/o SrB$_2$O$_4$·SrSiO$_3$ and 25 w/o SrAl$_2$O$_4$. The homogeneous mixture was pressed and then sintered at 1,150° C. for 2 hours. The magnetic properties of the product were as follows:

| Br | =3550 G. |
|---|---|
| H$_c$ | =3075 Oe. |
| H$_{ci}$ | =3225 |
| (BH)$_{max}$ | =3.1 × 10$^6$ G. Oe. |

The resulting samples were similar to those using the BaO-based additives. It is likely that during the course of densification, some of the BaO replaced SrO in the additive, the SrO being deposited as SrFe$_{12}$O$_{19}$-BaFe$_{12}$O$_{19}$ solid solution from the liquid phase.

EXAMPLE VII

Following the procedure of Example I, samples were prepared using commercial grade SrFe$_{12}$O$_{19}$, which from lot analysis contained 0.5–1.0 weight percent SiO$_2$. To the ferrite was added 2 weight percent of an additive represented by the formula BaB$_2$O$_4$·BaSiO$_3$. The magnets were then prepared as described in Example I above and the magnetic properties compared to those of a sample containing no additive. The comparative data is as follows:

|  | F | G |
|---|---|---|
| Br (G.) | 3350 | 3450 |
| H$_c$ (Oe.) | 3250 | 3300 |
| H$_{ci}$ (Oe.) | 4350 | 4575 |
| (BH)$_{max}$ (×10$^6$ G. Oe.) | 2.8 | 3.0 |

F SiO$_2$, 2 w/o Al$_2$O$_3$ in as-received material. No additive present. Sintered at 1200° C. for 2 hours in air.
G Same as F, but with 2 w/o BaB$_2$O$_4$·BaSiO$_3$ added.

From our experiments, we have been able to draw the following conclusions:

1. The presence of a liquid phase additive is required to optimize the densification and microstructural development of $MFe_{12}O_{19}$ magnets.
2. Liquid phase compositions in the systmes $MO-Al_2O_3-SiO_2$ and $MO-Al_2O_3-B_2O_3-SiO_2$, wherein M is a member selected from the group Pb, Sr, and Ba produce dense, sintered magnets with excellent magnetic properties.
3. $Al_2O_3$ is important in the control of the compact microstructure, and possibly crystallite morphology, which results in high values of $H_c$ and $H_{ci}$ with only a minor reduction in Br.
4. The quantity of liquid phase agent is important in that insufficient quantities result in less than perfect microstructure and morphology control, even though a high degree of densification is possible.

It will be appreciated that the invention is not limited to the specific details shown in the examples and illustrations and that various modifications may be made within the ordinary skill in the art without departing from the spirit and scope of the invention.

We claim:
1. In a method of making a permanent magnet from a magnetoplumbite ferrite powder having the formula $MFe_{12}O_{19}$, wherein M is selected from the group consisting of strontium and barium, including the steps of orienting the ferrite powder to align the crystals and wet pressing the powder to form a green compact, sintering the green compact at a temperature of about 1100°–1300° C. for a sufficient time to form a body having a density of at least 90% of the theoretical density and magnetizing the sintered ferrite composition, the improvement comprising homogeneously dispersing in the ferrite powder 0.5–6.0 percent by weight of a liquid phase sintering additive selected from the group consisting of the following systems:

$BaO—Al_2O_3—SiO_2$
$BaO—Al_2O_3—B_2O_3—SiO_2$
$SrO—Al_2O_3—SiO_2$
$SrO—Al_2O_3—B_2O_3—SiO_2$

2. The method of claim 1, wherein said ferrite is $BaFe_{12}O_{19}$.
3. The method of claim 1, wherein said ferrite is $SrFe_{12}O_{19}$.

* * * * *